United States Patent
Altenrath

(10) Patent No.: US 10,030,795 B2
(45) Date of Patent: Jul. 24, 2018

(54) CRIMP CONNECTION ARRANGEMENT FOR PRESSURIZED PIPES

(71) Applicant: EATON INDUSTRIAL IP GMBH & CO. KG, Schönefeld (DE)

(72) Inventor: Joerg Altenrath, Lohmar (DE)

(73) Assignee: EATON INTELLIGENT POWER LIMITED, Dublin (IE)

( * ) Notice: Subject to any disclaimer, the term of this patent is extended or adjusted under 35 U.S.C. 154(b) by 540 days.

(21) Appl. No.: 14/359,111

(22) PCT Filed: Nov. 29, 2012

(86) PCT No.: PCT/EP2012/073956
§ 371 (c)(1),
(2) Date: May 19, 2014

(87) PCT Pub. No.: WO2013/079590
PCT Pub. Date: Jun. 6, 2013

(65) Prior Publication Data
US 2014/0300107 A1    Oct. 9, 2014

(30) Foreign Application Priority Data

Nov. 29, 2011   (EP) .................................... 11191218

(51) Int. Cl.
*F16L 13/14*    (2006.01)
(52) U.S. Cl.
CPC .................................. *F16L 13/142* (2013.01)
(58) Field of Classification Search
USPC ........ 285/256, 382, 382.1–382.2, 382.7, 242
See application file for complete search history.

(56) References Cited

U.S. PATENT DOCUMENTS

| | | | | |
|---|---|---|---|---|
| 1,683,416 A | * | 9/1928 | Selah | H02G 3/06 285/323 |
| 1,736,149 A | * | 11/1929 | Dunmire | H02G 3/0616 220/3.2 |
| 1,746,956 A | * | 2/1930 | Metcalf, Jr. | F16L 19/086 285/323 |
| 1,814,481 A | * | 7/1931 | Metcalf, Jr. | F16L 19/0656 285/343 |
| 1,823,061 A | * | 9/1931 | Pearson | F16L 19/08 277/607 |
| 2,497,273 A | * | 2/1950 | Richardson | F16L 19/045 285/334.5 |
| 3,149,861 A | * | 9/1964 | Larsson | F16L 13/142 285/349 |

(Continued)

FOREIGN PATENT DOCUMENTS

| | | |
|---|---|---|
| DE | 202004002138 U1 | 6/2005 |
| EP | 2469142142 A1 | 6/2012 |

(Continued)

*Primary Examiner* — Aaron M Dunwoody
*Assistant Examiner* — Fannie C Kee
(74) *Attorney, Agent, or Firm* — Leydig, Voit & Mayer, Ltd.

(57) ABSTRACT

A crimp connection arrangement for pressurized pipes with a compression sleeve and a pipe, wherein an end piece of the pipe is insertable into the compression sleeve and wherein by an application of an external force to a pressing portion of the compression sleeve, a connection is achievable between the compression sleeve and the end piece of the pipe.

10 Claims, 3 Drawing Sheets

(56) References Cited

U.S. PATENT DOCUMENTS

| | | | | |
|---|---|---|---|---|
| 3,224,795 A | * | 12/1965 | Conley | F16L 23/024 |
| | | | | 138/109 |
| 3,606,396 A | * | 9/1971 | Prosdocimo et al. | |
| | | | | F16L 33/222 |
| | | | | 285/148.16 |
| 3,632,141 A | | 1/1972 | Larsson | |
| 4,083,587 A | * | 4/1978 | Leczycki | F16L 19/065 |
| | | | | 285/343 |
| 4,099,748 A | * | 7/1978 | Kavick | F16L 33/2076 |
| | | | | 285/256 |
| 4,328,982 A | | 5/1982 | Christianson | |
| 4,469,357 A | * | 9/1984 | Martin | B29C 61/0608 |
| | | | | 138/89 |
| 4,773,680 A | * | 9/1988 | Krumme | B23P 11/025 |
| | | | | 285/340 |
| 7,011,344 B1 | * | 3/2006 | Bakke | E21B 17/04 |
| | | | | 285/339 |
| 8,025,318 B1 | * | 9/2011 | Morroney | F16L 37/0925 |
| | | | | 285/322 |
| 2005/0264006 A1 | * | 12/2005 | McKay | F16L 13/146 |
| | | | | 285/256 |
| 2012/0161438 A1 | | 6/2012 | Rischen et al. | |

FOREIGN PATENT DOCUMENTS

| | | | |
|---|---|---|---|
| JP | 54106919 A | * | 8/1979 |
| WO | WO 9922170 A1 | | 5/1999 |

\* cited by examiner

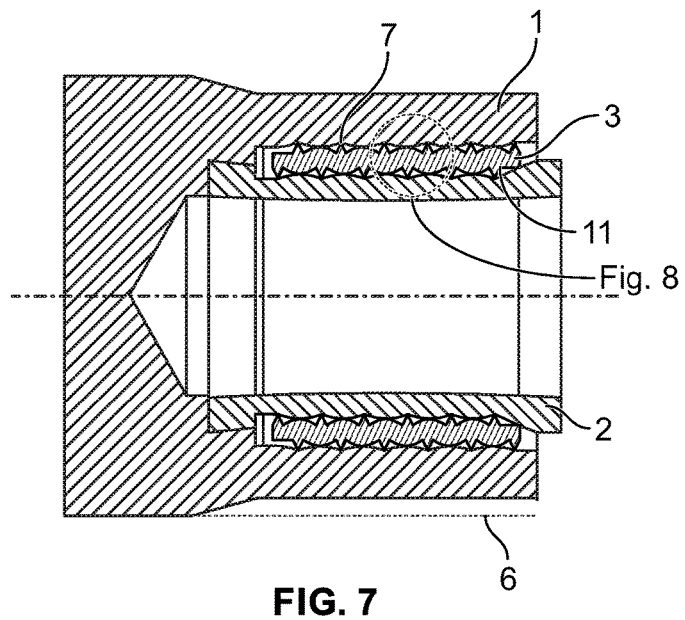
FIG. 7
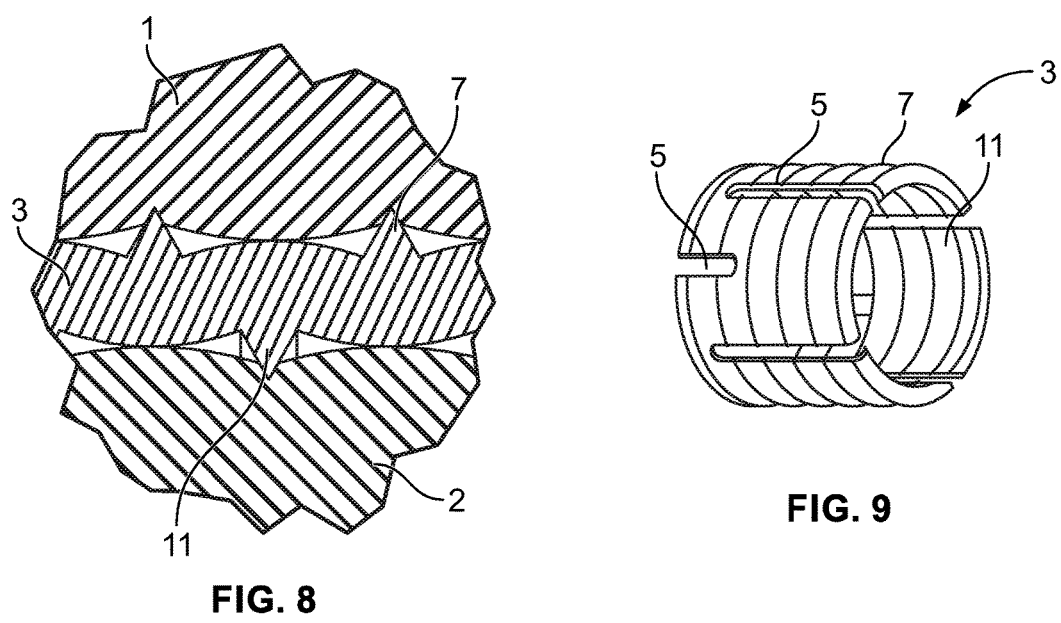
FIG. 8
FIG. 9

CRIMP CONNECTION ARRANGEMENT FOR PRESSURIZED PIPES

CROSS-REFERENCE TO RELATED APPLICATIONS

This application is a U.S. National Stage application under 35 U.S.C. § 371 of International Application No. PCT/EP2012/073956, filed on Nov. 29, 2012, and claims benefit to European Patent Application No. 11 191 218.4, filed on Nov. 29, 2011. The International Application was published in English on Jun. 6, 2013, as WO 2013/079590 A2 under PCT Article 21(2).

FIELD

The invention relates to a crimp connection arrangement for pressurized pipes with a compression sleeve and a pipe.

BACKGROUND

In known compression connections, as they are, for example, described in U.S. Pat. No. 4,328,982, the compression sleeve has an inner serration, which enters due to the force applied for producing the connection, the outer wall of the pipe. Thus, different and even conflicting material requirements for the respective portions of the compression sleeve result. The tubular outer portion of the compression sleeve, which is acted upon by the force, has to be deformed and requires a ductile material. After the pressing, the pipe as well as the compression sleeve relax according to the elastic deformation portion. To produce a radial pre-biasing between the compression sleeve and the pipe, the elastic relaxation of the compression sleeve has to be smaller than the elastic relaxation of the pipe. This can be achieved by a compression sleeve material of lower strength compared to the pipe material. However, for the serration of the compression sleeve, rather a material of high strength and hardness is required, to ensure the penetration into the pipe material. A disadvantage of the state of the art results from this inconsistency.

SUMMARY

An aspect of the invention provides a crimp connection arrangement for a pressurized pipes, the arrangement comprising: a compression sleeve including a pressing portion; a sleeve-like retaining element including an inner serration on at least a portion of an inner surface of the retaining element and an outer serration on at least a portion of an outer surface of the retaining element; and a pipe including an end piece, the end piece of the pipe being insertable into the compression sleeve, wherein, by applying a force onto the pressing portion of the compression sleeve, a connection is achievable between the compression sleeve and the end piece of the pipe, wherein the separate, sleeve-like retaining element is provided between the compression sleeve and the end piece of the pipe, wherein the retaining element includes a material of greater hardness than the compression sleeve and the pipe, wherein the retaining element is reducible in its diameter at least partially by the force applied onto the pressing portion, and wherein teeth of the inner serration are arranged in axial direction of the retaining element in a clearance between two adjacent teeth of the outer serration.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 7 is a sectional view of the pressing sleeve of the crimp connection arrangement according to FIG. 5 in a compressed condition;

FIG. 8 is a detail from FIG. 7 on a larger scale; and

FIG. 9 is a further embodiment of the retaining element.

Figure 1:
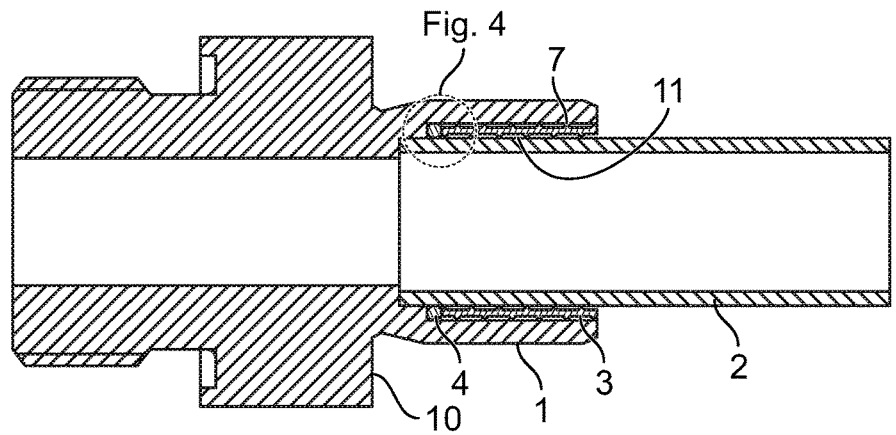
FIG. 1 is a sectional view of an embodiment of a crimp connection arrangement according to the invention in a non-compressed condition.

An aspect of the invention relates to a crimp connection arrangement for pressurized pipes with a compression sleeve and a pipe, wherein an end piece of the pipe is insertable into the compression sleeve and wherein by an application of a force to a pressing portion of the compression sleeve, a connection is achievable between the compression sleeve and the end piece of the pipe.

The crimp connection arrangement according to an aspect of the invention for pressurized pipes is provided to produce a compression connection between a compression sleeve and a pipe, wherein an end piece of the pipe is insertable into the compression sleeve and a connection can be produced between the compression sleeve and the end piece of the pipe by the application of a force onto a pressing portion of the compression sleeve. In this case, the connection is especially partially form-fitting and partially force-fitting. The external force application is achieved generally directed radially inwards and is also designated as compressing.

According to the invention, a separate, sleeve-like retaining element is provided between the compression sleeve and the end piece of the pipe, wherein the retaining element is made from a material with greater hardness than the compression sleeve and than the pipe. The retaining element is provided for entering by the force application the inner surface of the compression sleeve and the outer surface of the pipe, to produce the form- and/or force-fitting connection. The separation of the separate retaining element from the compression sleeve according to the invention solves the above described contradicting material requirements. For example, an inner diameter of the compression sleeve can, advantageously, be generally constant across the pressing portion; thus, the compression sleeve has a smooth-walled bore. The retaining element is described according to the invention as sleeve-like, as the retaining element has a diameter, which is larger than the outer diameter of the pipe and smaller than the inner diameter of the compression sleeve, so that the retaining element can be arranged like a sleeve between the pipe and the compression sleeve. The retaining element according to the invention can, however, differ from a sleeve in respect of structure and shape, to ensure, that the retaining element is reducible in its diameter at least portion-wise by means of a force application onto the pressing portion. Thus, it can, advantageously, be achieved, that the retaining element is deformable in its sleeve-like structure, but because of its higher strength, compared to the pipe and the compression sleeve, enters the same.

Preferably, the retaining element has a shape, which has, compared to a sleeve, a lower stability against the force application onto the pressing portion. A preferred embodiment of the crimp connection arrangement provides that the retaining element is formed as a slotted sleeve. This means, that at least one slot reduces the stability of the sleeve. The at least one slot is essentially arranged in axial direction of the sleeve, but can also extend partially or portion-wise in circumferential direction. A single slot can be formed all through in axial direction. With a multitude of slots, this would lead to the fact, that the retaining element is separated into two or more sleeve elements.

Preferably, a multitude of slots is provided in axial direction of the sleeve, wherein the slots extend over a portion of the axial length of the sleeve. Thus, the sleeve remains to be a single piece and is easier to handle. The slots can all extend from one sleeve end or from the one and the other sleeve end, preferably alternatingly. Preferably, the slots extend from the pipe-sided end of the retaining element, while the end of the retaining element, facing the compression sleeve, has no slots. Thus, a sealing element can abut the non-slotted end.

The retaining element has a serration, which advantageously facilitates the penetration into the surface of the compression sleeve and of the pipe, on its inner side and/or its outer side. Furthermore, the serration has, preferably, shallow and steep tooth flanks, wherein the steep tooth flanks provide a barb-like protection against a pulling-out of the pipe from the compression sleeve. The retaining element preferably comprises an inner serration on at least a portion of its inner surface and an outer serration on its outer surface, wherein a spacing of adjacent teeth of the inner serration and of the outer serration in axial direction of the retaining element is equal and wherein the teeth of the inner serration are arranged in axial direction of the retaining element in a clearance between two adjacent teeth of the outer serration. In other words, the teeth of the inner serration and of the outer serration are arranged alternately along the axial direction of the retaining element, in particular, a tooth of the outer serration is arranged in the middle between two adjacent teeth of the inner serration, respectively. The retaining element is thus advantageously stressed in an axial direction when the force is applied to the pressing portion of the compression sleeve.

Furthermore preferably, the serrations comprise teeth with one higher-angeled, steep tooth flank and one lower-angeled shallow tooth flank, wherein the teeth of the outer serration have the steep tooth flank facing the end of the retaining element where the pipe is inserted and/or wherein the teeth of the inner serration have the shallow tooth flank facing the end of the retaining element where the pipe is inserted, thus achieving the advantageous barb-like protection against a pulling-out of the pipe from the compression sleeve referred to above.

Preferably, an inner diameter of the compression sleeve is essentially constant across the pressing portion. Thus, the compression sleeve is essentially less complex to manufacture than with an internal serration. The compression sleeve can, preferably, be manufactured with a smooth bore and without different hardness portions with less effort.

Preferably, the retaining element has at its pipe-sided end, which is the end where the pipe is inserted into the retaining element, a portion with constant inner diameter, i.e. without serration at the inner side. Thus, a notching by the penetration of the serration in the area of the pipe-sided end of the compression sleeve, weakening the structure of the pipe, is prevented.

Preferably, the retaining element can be pre-assembled in the compression sleeve. Furthermore, the possibility exists, that a sealing element is connected to the retaining element, for example bonded or vulcanised. For producing the compression connection, only the pipe end has to be inserted into the compression sleeve with the pre-assembled retaining element and the sealing element and the pressing procedure has to be carried out. An abutment within the compression sleeve can also be omitted. The outer diameter of the retaining element is, preferably, slightly larger than the inner diameter of the compression sleeve, a so-called interference fit. Thus, the retaining element can be pre-assembled with the compression sleeve to form one component, for example by means of axial pressing of the retaining element into the compression sleeve. When the retaining element is pre-assembled with the compression sleeve, the sealing element can advantageously be clamped axially between the compression sleeve and the retaining element. In this preferred embodiment it is not necessary, that the sealing element is connected to the retaining element.

Figure 2:
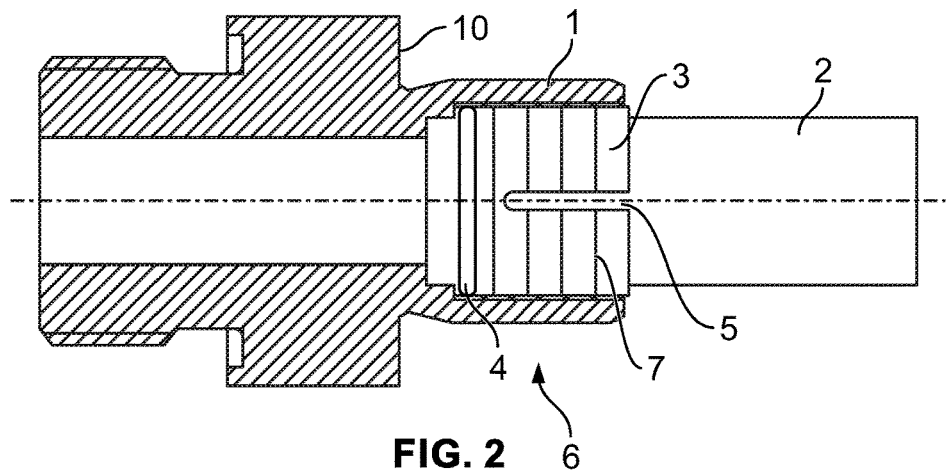
FIG. 2 is the crimp connection arrangement of FIG. 1 shown partially in a sectional view.
Figure 3:
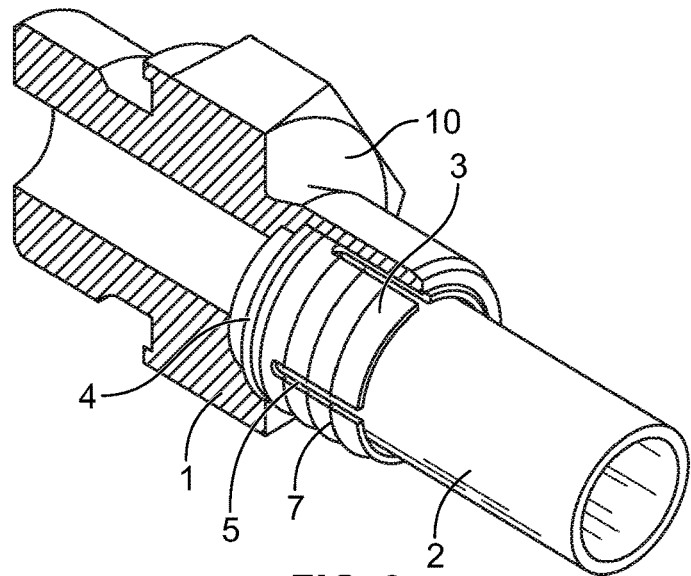
FIG. 3 is the crimp connection arrangement of FIG. 1 shown in a perspective view and partially in a sectional view.

FIGS. 1 to 3 show an embodiment of the crimp connection arrangement according to the invention in a non-compressed condition, in three slightly different representations. Therefore, FIGS. 1 to 3 are described together.

The crimp connection arrangement according to the invention has a compression sleeve 1 and a pipe 2, wherein an end piece of the pipe 2 is inserted into the compression sleeve 1 and a connection between the compression sleeve 1 and the end piece of the pipe 2 can be produced by a radially directed applied force onto the pressing portion 6 of the compression sleeve 1. A sleeve-like retaining element 3 between the compression sleeve 1 and the end piece of the pipe 2 is separate from the compression sleeve 1 and is made from a material of greater hardness than the compression sleeve 1 and the pipe 2. The retaining element 3 is reducible despite its hardness in its diameter at least portion-wise by the applied force onto the pressing portion, i.e., such that the retaining element 3 is pressed into the surface of the pipe 2. The retaining element 3 penetrates, in this case, the inner surface of the compression sleeve 1. The deformability of the retaining element 3 results from its shape. The basic sleeve-like structure of the retaining element 3 is weakened by a multitude of slots 5 (FIGS. 2 and 3), compared to a non-slotted sleeve, such that a generally elastic deformation is achieved by the applied force onto the pressing portion 6. The plastic deformation of the compression sleeve 1 prevents later a relaxation of the retaining element 3.

Preferably, the retaining element 3 has an outer serration 7 and an inner serration 11. The serrations 7, 11 penetrate advantageously easier the surfaces of the pipe 2 and of the compression sleeve 1. In a pipe-sided end piece of the retaining element 3, the retaining element 3 has no inner serration 11, to prevent a notching effect in the pipe 2.

The slots 5 extend in an axial direction across a partial length of the retaining element 3. On the side, facing the compression sleeve, the retaining element 3 is not slotted all through, so that a continuous abutment face for a seal 4 is formed, which seal 4 can be bonded or vulcanised to the retaining element 3.

The compression sleeve 1 has, neighbouring the pressing portion 6, an abutment 10 for the crimping dies, by means of which the applied external force acts onto the compression sleeve 1.

Figure 4:
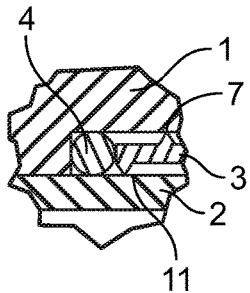
FIG. 4 is a detail from FIG. 1 on a larger scale.

In FIG. 4, FIG. 1 is shown in a larger scaled sectional view. The teeth of the outer serration 7 and of the inner serration 11 are visibly arranged alternatingly along an axial direction of the retaining element 3. The sealing element 4 is arranged in a slot between the retaining element 3 and an abutment inside the compression sleeve 1.

In FIGS. 5 through 8, a simplified embodiment of the compression sleeve 1 is shown in sectional views, having the form of a blind plug. That is, however, not relevant with regard to the invention. The pipe 2 is inserted into the compression sleeve 1 and abuts an abutment inside the compression sleeve 1. The retaining element 3 is arranged in between the compression sleeve 1 and the pipe 2. A sealing is not depicted.

Figure 5:
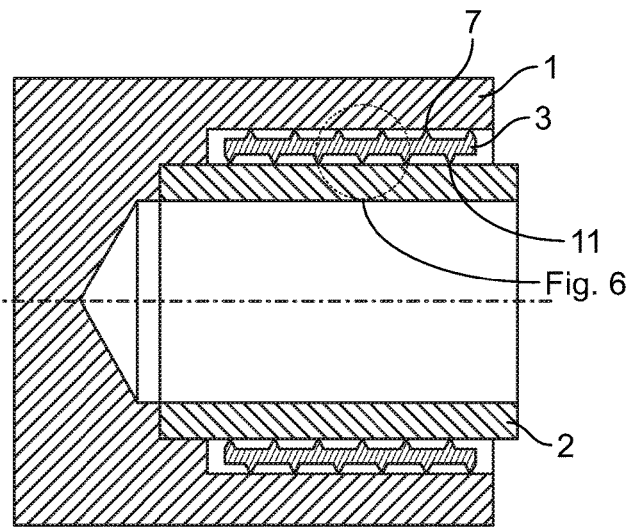
FIG. 5 is a sectional view of a pressing sleeve of another embodiment of the crimp connection arrangement according to the invention in a non-compressed condition.
Figure 6:
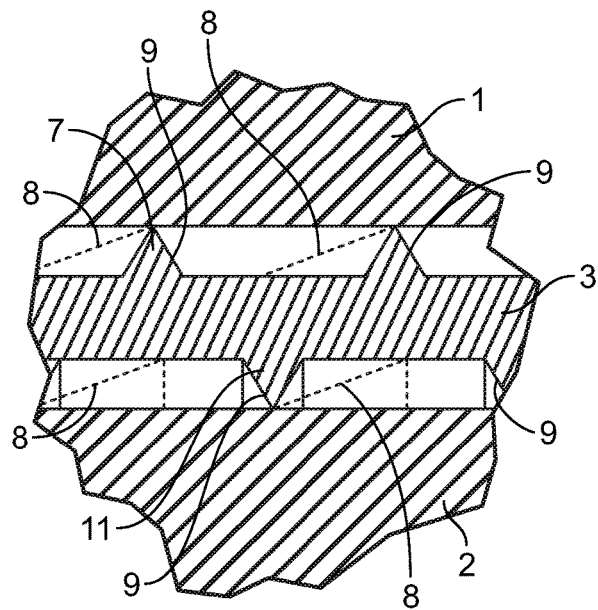
FIG. 6 is a detail from FIG. 5 on a larger scale.

In FIG. 6, FIG. 5 is shown on a larger scale. Perceptibly, the teeth of the inner serration 11 are respectively arranged in the middle between two adjacent teeth of the outer serration 7. With respect to FIG. 6, a further preferred embodiment is described, wherein the serrations 7, 11 each comprise teeth with one steep flank 9 and one shallow flank 8, depicted by a dotted line. The steep flanks 9 of the outer serration 7 and the shallow flanks 8 of the inner serration 11 are each facing towards the end of the compression sleeve 1, where the pipe is inserted, whereas the steep flanks 9 of the inner serration 11 and the shallow flanks 8 of the outer serration 7 are facing towards the opposite direction. Thus, a serration 7, 11 is provided, whereby a barb-like resistance against pulling out of the pipe 2 from the compression sleeve 1 is advantageously achieved.

FIG. 7 shows the crimp connection arrangement according to FIG. 5, but in a compressed or crimped condition, i.e. after the force has been applied onto the pressing portion 6. In the pressing portion 6, the compression sleeve 1 is plastically deformed. The retaining element 3 is crimped between the compression sleeve 1 and the pipe in such a way, that the serrations 7, 11 have penetrated the inner surface of the compression sleeve 1 and the outer surface of the pipe 2.

In FIG. 8, a detail marked with reference numeral D in FIG. 7 is shown on a larger scale. Therein, the penetration of the pipe 2 and the compression sleeve 1 by the serrations 7, 11 is perceptible. The retaining element 3, due to the alternating arrangement of the respective teeth of the inner serration 11 and the outer serration 7, is radially stressed. Thus, an advantageously fast connection of the pipe 2 in the compression element 1 is provided, with the retaining element 3 as a connecting link.

FIG. 9 shows an embodiment of the retaining element 3 in the form of a slotted sleeve with slots 5 running in parallel in a longitudinal or axial direction along a part of the length of the sleeve, starting alternately on one and the other end of the retaining element 3. At the end of the retaining element 3 where the pipe is inserted, a part of the inner surface of the retaining element 3 does not comprise the inner serration 11.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

REFERENCE NUMERALS LIST 1 compression sleeve
2 pipe
3 retaining element
4 sealing element
5 slot
6 pressing portion
7 outer serration
8 shallow tooth flank
9 steep tooth flank
10 abutment
11 inner serration

The invention claimed is:

1. A crimp connection arrangement for a pressurized pipe, the crimp connection arrangement comprising:
a compression sleeve including a pressing portion;
a retaining element including (i) an inner serration having a plurality of teeth on at least a portion of an inner surface of the retaining element and (ii) an outer serration having a plurality of teeth on at least a portion of an outer surface of the retaining element; and
a pipe including an end piece, the end piece of the pipe being inserted into the compression sleeve,
wherein, by applying a force onto the pressing portion of the compression sleeve, a connection is achievable between the compression sleeve and the end piece of the pipe,
wherein the retaining element is provided between the compression sleeve and the end piece of the pipe,
wherein the retaining element includes a material of greater hardness than the compression sleeve and the pipe,
wherein the retaining element is reducible in diameter at least partially by the force applied onto the pressing portion,
wherein the teeth of the inner serration are arranged alternatingly with the teeth of the outer serration in an axial direction of the retaining element so that each of the teeth of the inner serration is disposed in an axial clearance between two adjacent teeth of the teeth of the outer serration in the axial direction, a single respective tooth of the inner serration being disposed in the respective axial clearance between each two adjacent teeth of the outer serration, and
wherein application of the force onto the pressing portion creates an arced surface on the retaining element between respective adjacent inner serrations, and an arced surface on the retaining element between respective adjacent outer serrations, such that the retaining element is both radially and axially stressed.

2. The crimp connection arrangement of claim 1, wherein a spacing of adjacent teeth of the inner serration and of the outer serration in the axial direction of the retaining element is equal.

3. The crimp connection arrangement of claim 1, wherein the retaining element includes a slot, and the slot is arranged substantially in an axial direction of the retaining element.

4. The crimp connection arrangement of claim 1, wherein a multitude of slots is provided in an axial direction of the retaining element, wherein the slots extend over a portion of an axial length of the retaining element.

5. The crimp connection arrangement of claim 1, wherein the retaining element includes a portion with a constant inner diameter at a pipe-sided end of the retaining element, the pipe-sided end facing outwardly of the compression sleeve when the retaining element is inserted into the compression sleeve.

6. The crimp connection arrangement of claim 1, wherein each of the teeth of the inner and outer serrations include a steep tooth flank and a shallow tooth flank, and
wherein the teeth of the outer serration have the steep tooth flank facing a pipe-insertion end of the retaining element,
wherein the teeth of the inner serration have the shallow tooth flank facing the pipe-insertion end, or wherein the teeth of the outer serration have the shallow tooth flank, and the teeth of the inner serration have the steep tooth flank, facing away from the pipe-insertion end.

7. The crimp connection arrangement of claim 1, wherein an inner diameter of the compression sleeve is substantially constant across the pressing portion.

8. The crimp connection arrangement of claim 1, wherein the retaining element is pre-assembled in the compression sleeve.

9. The crimp connection arrangement of claim 1, further comprising:
a sealing element,
wherein the sealing element is connected to the retaining element.

10. A crimp connection arrangement for a pressurized pipe, the crimp connection arrangement comprising:
a compression sleeve including a pressing portion;
a retaining element including (i) an inner serration having a plurality of teeth on at least a portion of an inner surface of the retaining element and (ii) an outer serration having a plurality of teeth on at least a portion of an outer surface of the retaining element; and
a pipe including an end piece, the end piece of the pipe being insertable into the compression sleeve,
wherein, by applying a force onto the pressing portion of the compression sleeve, a connection is achievable between the compression sleeve and the end piece of the pipe,
wherein the retaining element is provided between the compression sleeve and the end piece of the pipe,
wherein the retaining element includes a material of greater hardness than the compression sleeve and the pipe,
wherein the retaining element is reducible in diameter at least partially by the force applied onto the pressing portion,
wherein the teeth of the inner serration are arranged alternatingly with the teeth of the outer serration in an axial direction of the retaining element so that each of the teeth of the inner serration is disposed in an axial clearance between two adjacent teeth of the teeth of the outer serration in the axial direction, a single respective tooth of the inner serration being disposed in the respective axial clearance between each two adjacent teeth of the outer serration,
wherein each of the teeth of the inner and outer serrations include a steep tooth flank and a shallow tooth flank,
wherein the teeth of the outer serration have the steep tooth flank facing a pipe-insertion end of the retaining element, and
wherein the teeth of the inner serration have the shallow tooth flank facing the pipe-insertion end, or wherein the teeth of the outer serration have the shallow tooth flank, and the teeth of the inner serration have the steep tooth flank, facing away from the pipe-insertion end.

\* \* \* \* \*